United States Patent Office 3,124,599
Patented Mar. 10, 1964

3,124,599
PROCESS FOR PREPARING 1,6-DIACETOXY-2,5-DIMETHYL-2-HEXENE; 1,2,6 - TRIACETOXY-2,5-DIMETHYL - HEXANE; AND 2,5 - DIMETHYL-TETRA-HYDROPYRAN-2-METHANOL ACETATE
Howard R. Guest, Charleston, Ben W. Kiff, Ona, and Harry A. Stansbury, Jr., South Charleston, W. Va., assignors to Union Carbide Corporation, a corporation of New York
No Drawing. Original application Feb. 20, 1957, Ser. No. 641,235, now Patent No. 2,910,520, dated Oct. 27, 1959. Divided and this application May 13, 1959, Ser. No. 812,823
4 Claims. (Cl. 260—345.8)

This invention relates to novel processes for the preparation of 2,5-dimethyl-2,4-hexadiene. More particularly it relates to methods for preparing 2,5-dimethyl-2,4-hexadiene from methacrolein and certain novel intermediates obtained thereby.

This application is a divisional application of Serial No. 641,235, now Patent No. 2,910,520, H. R. Guest et al. entitled "Process for Preparing 2,5-Dimethyl-2,4-Hexadiene," filed February 20, 1957 and assigned to the same assignee as the present invention.

Heretofore it has been suggested to prepare 2,5-dimethyl-2,4-hexadiene by treating methallyl chloride with magnesium dissolved in a suitable medium such as ethyl ether to form 2,5-dimethyl-1,5-hexadiene. This product was then converted to 2,5-dimethyl-2,4-hexadiene by treatment with a suitable acid catalyst in liquid phase or chrome alumina, for example, in vapor phase.

The reaction of magnesium in ethyl ether with methallyl chloride or the reaction of metallic sodium with isocrotyl chloride is, however, a hazardous procedure when undertaken on a scale suitable for commercial purposes. A further difficulty exists in that the expensive metals employed were converted to the chlorides which have virtually no value.

We have now discovered, unexpectedly, that 2,5-dimethyl-2,4-hexadiene can be prepared by alternative processes from methacrolein, a relatively inexpensive starting material. These processes involve a series of steps, the reactions of which are described as follows:

PROCESS 1

Step 1

Methacrolein is caused to react by heating at temperatures of approximately 140° C. to 225° C. and preferably at 150° C. and under autogenous pressure e.g., 500 pounds per square inch (p.s.i.) to form methacrolein dimer (3,4 - dihydro - 2,5-dimethyl-2-formyl-2H-pyran), which when hydrogenated with Raney nickel catalyst at temperatures of approximately 80° C. to 160° C. and under pressure of 100 pounds per square inch (p.s.i.) to 1000 p.s.i. forms 2,5-dimethyltetrahydropyran-2-methanol. It should be noted that a preferred hydrogenation temperature of 100° C. with a pressure of approximately 150 p.s.i. This reaction can be described graphically in the following manner.

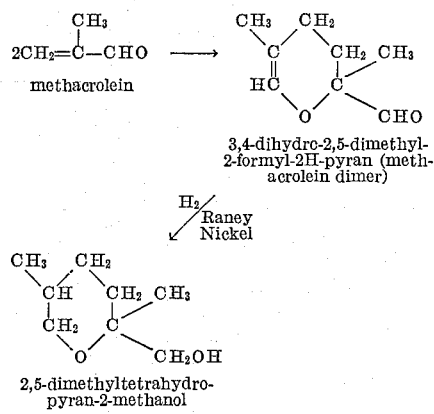

Step 2

A novel compound, 1,6-diacetoxy-2,5-dimethyl-2-hexene is prepared from 1,2,6-triacetoxy-2,5-dimethylhexane by the release of acetic acid therefrom. 1,2,6-triacetoxy-2,5-dimethylhexane is prepared directly by the treatment of 2,5-dimethyltetrahydropyran-2-methanol from Step 1, with acetic anhydride and a Lewis acid or strong mineral acid such as, for example, aluminum chloride, boron trifluoride, zinc chloride, stannic chloride, sulfuric acid, phosphorous pentoxide, nitric acid or phosphoric acid as a catalyst therefore at elevated temperatures, e.g., 140° C. to 160° C. Further novel compounds resulting from this same reaction in small quantitative amounts are 2,5-dimethyltetrahydropyran-2-methanol acetate and 1,2,6-triacetoxy-2,5-dimethylhexane. Further reaction of these latter compounds by further heating with acetic anhydride and a Lewis acid or strong mineral acid will result in their conversion to the desired diester, 1,6-diacetoxy-2,5-dimethyl-2-hexene. This is illustrated by the following schematic equation:

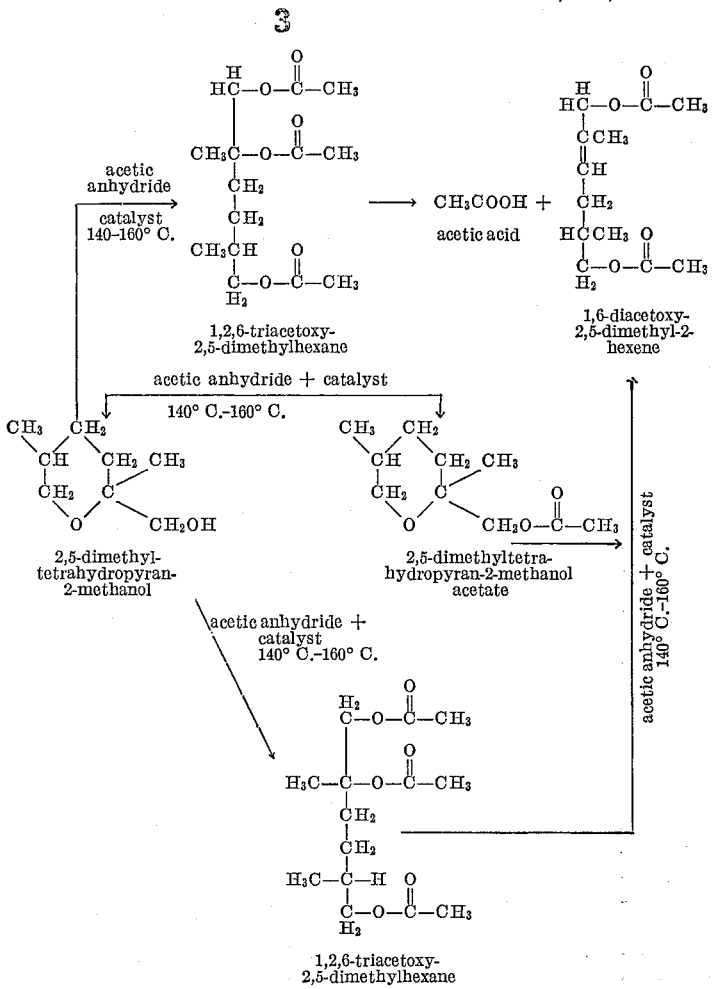

Step 3

The 1,6-diacetoxy-2,5-dimethyl-2-hexene from Step 2 is then hydrogenated with a Raney nickel catalyst under autogenous pressure e.g., 150 p.s.i. at 30° C. to 65° C. and preferably 40° C. This reaction results in the formulation of about sixty percent by weight of 1,6-diacetoxy-2,5-dimethylhexane, a novel compound. In the remainder hydrogenolysis of one of the ester groups of the starting material, 1,6-diacetoxy-2,5-dimethyl-2-hexene, occurs with the formation of acetic acid and the novel unsaturated monoester, 2,5-dimethyl-4-hexenyl acetate. Under the condition of the reaction the resultant double bond is not hydrogenated.

This reaction can be illustrated graphically as follows:

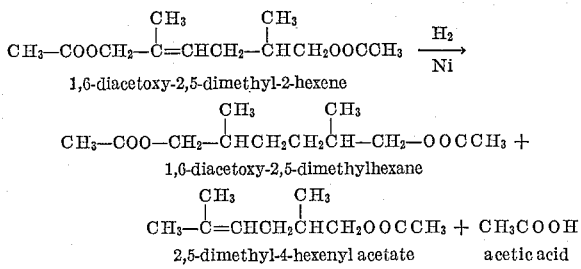

Step 4

Both products resulting from Step 3 are pyrolyzed to form a hexadiene mixture, i.e., 2,5-dimethyl-2,4-hexadiene and 2,5-dimethyl-1,5-hexadiene. The preferred thermal treatment temperature is about 335° C. This pyrolysis is accomplished by passing the filtered product from the hydrogenation of Step 3 over a suitable aluminum-containing catalyst such as, for example, solid aluminum phosphate on alumina at a temperature of 250° C. to 375° C. with a contact time of approximately 80 seconds to 120 seconds. The preferred operating temperature is 335° C. with a period of contact of about 110 seconds.

The resultant hexadiene mixture is separated from acetic acid produced in the reaction by a simple steam distillation. About 60 percent of the diene mixture is the desired 2,5-dimethyl-2,4-hexadiene. The remaining 40 percent, which is the 1,5-isomer, referred to hereinabove, can be converted to the desired 2,5-dimethyl-2,4-hexadiene by vapor-phase isomerization over a chrome-alumina catalyst. This isomerization can be accomplished alternatively by heating the 1,5-diene in the liquid phase with a catalytic amount of a strong mineral acid, such as, preferably, sulfuric acid, para-toluenesulfonic acid, benzenesulfonic acid or sulfoacetic acid. Less preferred strong mineral acids which can be employed are, for example, phosphoric acid, nitric acid, and hydrochloric acid.

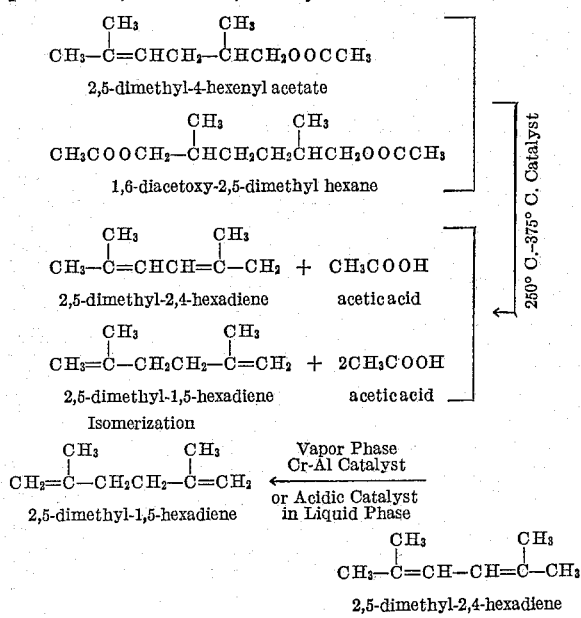

PROCESS 2

A novel alternate method for the preparation of 2,5-dimethyl-2,4-hexadiene involves the synthesis of methacrolein dimer (3,4-dihydro-2,5-dimethyl-2-formyl-2H-pyran) as described in Step 1 of Process 1 referred to hereinabove. The methacrolein dimer can be hydrogenated at a pressure of 2500 to 5000 p.s.i. or preferably 4000 p.s.i. and temperatures of 140° C. to 350° C. using a copper chromium catalyst to form 2,5-dimethyl-1,6-hexanediol a novel compound. Alternatively, the dimer can be hydrogenated at a temperature in the range of 40° C. to 160° C. and preferably about 100° C. using a Raney nickel catalyst at pressure of about 100 to 1000 p.s.i. with a preferred pressure of about 150 p.s.i., to form 2,5-dimethyl tetrahydropyran-2-methanol, subsequent hydrogenolysis of which, at a temperature of about 225° C. to 400° C., or preferably 300° C., and a pressure of 2500 to 5000 p.s.i., or again a preferred pressure of 4000 p.s.i. and employing a copper-chromium-barium catalyst results in the formation of the diol, i.e., 2,5-dimethyl-1,6-hexanediol, a novel compound. Acetylation of this diol causes the production of 1,6-diacetoxy-2,5-dimethylhexane. This hexane can then be pyrolyzed as described above in Step 4 of Process 1 to form substantially the same product mixture of 2,5-dimethyl-2,4-hexadiene, 2,5-dimethyl-1,5-hexadiene and acetic acid described therein. The diene mixture is separated from the acetic acid produced in the reaction by a standard steam distillation, and the 1,5-diene product converted as described in Step 4 of Process 1 to the desired 2,4-diene isomer. The preparation of 1,6-diacetoxy-2,5-dimethylhexane, pyrolysis of which results in the diene mixture referred to immediately hereinabove, can be illustrated graphically as follows:

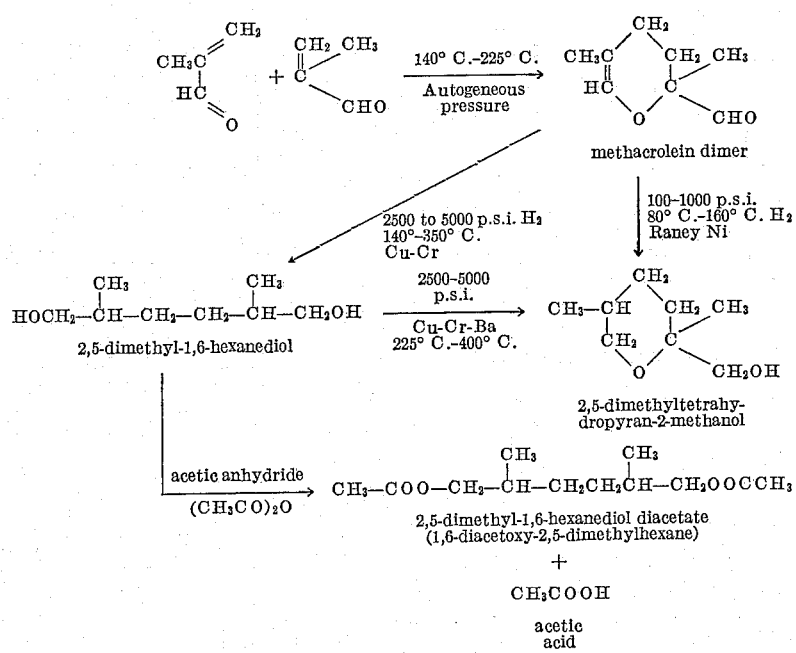

2,5-dimethyl-2,4-hexadiene, prepared from the novel products of this invention, is an important starting material in the synthesis of chrysanthemum acid chloride from which pyrethrin, a valuable insecticide, can be synthesized. The series of steps necessary to this preparation may be illustrated schematically as follows:

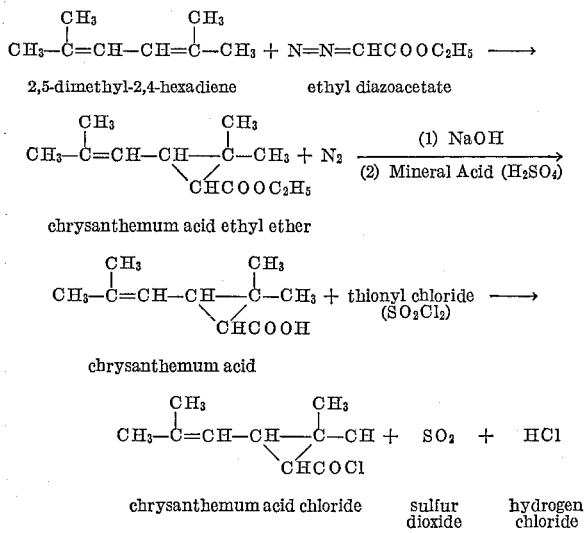

2,5-dimethyl-2,4-hexadiene    ethyl diazoacetate chrysanthemum acid ethyl ether chrysanthemum acid chrysanthemum acid chloride    sulfur dioxide    hydrogen chloride The preparation of pyrethrin from chrysanthemum acid chloride is described by LaForge and Barthel in the Journal of Organic Chemistry, vol. 12, pages 199 to 202 (1947).

It should be noted, in addition, that 2,5-dimethyl-1,6-hexanediol is also of value in the preparation of esters which are of value as plasticizers, solvents and synthetic lubricants, and is of particular value when employed as an insect repellant.

The following examples are further illustrative of our invention:

EXAMPLE 1

(a) A charge of 1000 grams (g.) of methacrolein (92 percent) and 10 grams of hydroquinone was placed in a 3.1 stainless steel Adkins bomb and heated to 140° C. for 16 hours while agitating by means of a rocking mechanism in which the bomb was suspended. The initial pressure was 195 p.s.i. and fell to 150 p.s.i. at the conclusion of the run.

The material was discharged after cooling and the unreacted methacrolein stripped off at atmospheric pressure. The distillation was continued at reduced pressure and 744 grams of 3,4-dihydro-2,5-dimethyl-2-formyl-2H-pyran boiling at 50° C. at 10 mm. was obtained. A high boiling residue remained which weighed 99 grams. The yield to the dimer was 81 percent (%) with an efficiency of 86 percent based on the methacrolein charged.

(b) A charge of 1000 grams of methacrolein dimer prepared in the foregoing manner and 50 grams of commercial Raney nickel catalyst were placed in an Adkins bomb contained in a rocking mechanism and hydrogenated at 150° C. and 2000 p.s.i. hydrogen pressure. The material was discharged, filtered, and distilled. A total of 914 grams of 2,5-dimethyltetrahydropyran-2-methanol boiling at 51° C./1.1 mm. was obtained. This was a yield of 91 percent based on the dimer charged.

(c) A charge of 4000 grams of acetic anhydride, 576 grams of 2,5-dimethyltetrahydropyran-2-methanol and 8 grams of zinc chloride were placed in a distilling flask and refluxed for 11 hours at a kettle temperature of 140° C. At the end of the reflux period the acetic acid produced in the reaction and the excess acetic anhydride were distilled off to a head temperature of 69° C./4 mm. A small amount of 2,5-dimethyltetrahydropyran-2-methanol acetate was collected as a heads cut and 743 grams of 1,6-diacetoxy-2,5-dimethyl-2-hexene boiling over the range of 90° C./2 mm. to 110° C./1.0 was obtained as the main fraction. A small tails cut containing 1,2,6-triacetoxy-2,5-dimethylhexane was obtained. The total weight of the two by-product esters was 88 grams. These materials are converted to the desired unsaturated diester with good efficiency, 85 percent, by further reaction with acetic anhydride in the presence of the catalyst as described immediately above.

The yield of the desired product was 81.3 percent and the efficiency 89.9 precent based on the amount of methacrolein charged.

The novel intermediate products prepared by this acetlyation reaction were characterized as follows:

1,2,6-triacetoxy-2,5-dimethylhexane:
  Boiling Point (B.P.) _____ 120° C.–125° C./2 mm.
  Specific Gravity (Sp. Gr.) at 20°/20° C _____ 1.064.
  Index of refraction (N 30/D) _ 1.4370.
2,5-dimethyltetrahydropyran-2-methanol acetate:
  B.P. _____ 60° C./1 mm.
  Sp. Gr. at 20°/20° C _____ 0.995.
  N 30/D _____ 1.4420.
1,6-diacetoxy-2,5-dimethyl-2-hexene:
  B.P. _____ 105° C.–110° C./2 mm.
  Sp. Gr. at 20°/20° C _____ 1.010.
  N 30/D _____ 1.4430.

(d) A charge of 652 grams of 1,6-diacetoxy-2,5-dimethyl-2-hexene and 33 grams of commercial Raney nickel catalyst were placed in an Adkins bomb and hydrogenated at 50° C. and 150 p.s.i. hydrogen pressure. The reaction required 13 hours for completion. The product was discharged and the catalyst filtered out. The reaction product was composed of 68 grams of acetic acid, and the novel esters of 2,5-dimethyl-4-hexenyl acetate (209 grams) and 1,6-diacetoxy-2,5-dimethylhexane (385 grams).

These novel compounds were determined to have the following characteristics:

2,5-dimethyl-4-hexenyl acetate:
  B.P. _____ 38° C./0.1 mm.
  Sp. Gr. at 20°/20° C _____ 0.878.
  N 30/D _____ 1.4214.
1,6-diacetoxy-2,5-dimethylhexane:
  B.P. _____ 101° C./1 mm.
  Sp. Gr. at 20°/20° C _____ 0.986.
  N 30/D _____ 1.4292.

(e) The apparatus employed for this step in the process was a steel tube 1 inch in diameter (I.D.) fitted with an electrically-wound jacket containing an oil by means of which the temperature could be maintained at a constant level. The tube was charged with 340 cc. of a catalyst in the following manner:

To 375 grams of activated alumina pellets (4 x 8 mesh) was added a solution of 450 grams of $Al(NO_3)_3 \cdot 9H_2O$ in 300 cc. of water. This mixture was allowed to reflux gently for 2 hours. The liquid was then drained from the catalyst particles. A solution of 138 grams of diammonium phosphate in 300 cc. of water was then added and the mixture was allowed to stand at 50° C. for 2 hours. The excess liquid was then drained off and the catalyst was dried overnight in a vacuum oven at 75° C.

A total of 674 grams of crude hydrogenation product as discharged from the bomb was fed over the catalyst at the rate of 50 cc./hour while the jacket temperature was maintained at 335–340° C. A total of 615 grams of liquid was obtained by passing the effluent gas through a water-cooled condenser. This liquid was distilled to a kettle temperature of 52° C./25 mm. A total of 588 grams of distillate was obtained while a high-boiling residue of 15 grams remained behind. The distillate was then charged to a distilling flask and distilled with water. The top layer was removed as distillate while the lower layer was returned to the kettle. A total of 378 grams of upper layer was obtained while 301 grams of material which contained 60.3 percent acetic acid remained in the kettle. The distillate was then fractionated and 296 grams of mixed 2,5-dimethyl-1,5-hexadiene and 2,5-dimethyl-2,4-hexadiene was obtained. This represented a yield of 91.9 percent of the theoretical. Approximately 60 percent of the mixture of dienes was the desired 2,4 isomer.

The catalyst for the isomerization was prepared as follows:

Activated alumina pellets (500 grams of 4 x 8 mesh) were shaken with a solution of 50 grams of chromic acid in 250 cc. of water for 20 minutes. The excess liquid was drained off and the catalyst was dried overnight at 120° C.

The reactor was a stainless steel tube 1½ inches diam. and 4 feet in length jacketed with an electrically-heated reservoir containing a heating oil. Five hundred cc. of catalyst prepared in the above manner was charged to the lower section of the reactor and the upper part was filled with 750 cc. of 4 x 8 mesh Aloxite (a commercial variety of fused aluminum oxide). A flow of hydrogen was passed through the tube while the temperature was held at 425° C. for 5 hours.

A total of 886 grams of 2,5-dimethyl-1,5-hexadiene was then fed at the rate of 90 cc. per hour while the temperature was held at 220–225° C. This provided a contact time of 72 seconds for the vapors in the catalyst zone.

The gas effluent from the converter was condensed by passing through a water cooled condenser and a total of 882 grams were obtained. This was found to be 90 percent 2,5-dimethyl-2,4-hexadiene. The yield based on the 1,5 isomer fed was 89.5 percent with an efficiency of 95.7 percent.

(f) A charge of 300 grams of 2,5-dimethyl-1,5-hexadiene, 1.5 grams of para-toluenesulfonic acid, and 0.5 gram tert-butyl catechol was placed in a flash equipped with a reflux condenser and heated for 3½ hours at a kettle temperature of 135° C. The product was distilled under reduced pressure and 250 grams of the desired 2,5-dimethyl-2,4-hexadiene was obtained along with 40 grams of unchanged 1,5 diene. The yield to the 2,4-isomer was therefore 83.2 percent and the efficiency 96.3 percent.

EXAMPLE 2

(a) 1. A mixture of 873 grams of 2,5-dimethyltetrahydropyran-2-methanol and 25 grams of barium promoted copper chromite catalyst (Harshaw Chemical Company Cu-0 401P) was hydrogenated at 300° C. and 4000 pounds per square inch pressure for 6 hours. The reaction product was filtered and distilled under reduced pressure to obtain 2,5-dimethyl-1,6-hexanediol having these properties: distillation range 117°–122° C./2.5 mm., Sp. Gr. 20/20° 0.950, N 30/D 1.4550, molecular weight by the Menzies-Wright method 148.5 (theoretical 146), equivalent weight by hydroxyl analysis 73.4 (theoretical 73). The yield and efficiency were 45 percent and 83 percent respectively. This colorless, viscous diol, which is a new compound, was approximately 5 percent soluble in water at 20° C.

(a) 2. A mixture of 1000 grams of methacrolein dimer and 30 grams of copper chromite catalyst (Harshaw Chemical Company Cu–0102–P) was stirred in a 1 gallon autoclave under 3000 p.s.i. of hydrogen pressure at 140° C. After 30 minutes, the absorption of hydrogen had ceased. The temperature and pressure were increased to 300° C.–350° C. and 4000 p.s.i. to complete the reaction. After 5.5 hours under these conditions the product was cooled, filtered and distilled. The 2,5-dimethyl-1,6-hexanediol was obtained with 25 percent yield and 78 percent efficiency.

(a) 3. A mixture of 1000 grams of methacrolein dimer and 50 grams of Raney nickel was hydrogenated in a rocking, stainless steel bomb at 1500 p.s.i. pressure and 78° C.–190° C. The temperature was then increased to 295° C.–300° C. with a pressure of 3500 p.s.i. for 5 hours. The product was filtered and distilled to obtain 2,5-dimethyl-1,6-hexanediol with a 10 percent yield. The 2,5-dimethyltetrahydropyran-2-methanol was formed with 85 percent yield.

(a) 4. A mixture of 1964 grams of 2,5-dimethyltetrahydropyran-2-methanol and 60 grams of copper-iron chromite was hydrogenated in an autoclave at 300° C.–305° C. and 4000 p.s.i. for 6 hours. The product was filtered and distilled to obtain 2,5-dimethyl-1,6-hexanediol with 12 percent yield.

(b) While 568 grams of 2,5-dimethyl-1,6-hexanediol (3.89 moles) were heated at 140° C.–160° C., 1588 grams of acetic anhydride (15.56 moles, 100 percent excess) were added over a period of 30 minutes. The acetic acid was then distilled to a head temperature of 134° C., and a kettle temperature of 186° C. The residue was fractionated under reduced pressure to obtain the diacetate having the following properties: Boiling Point 101° C. at 1 mm., N 30/D 1.4292, Sp. Gr. 20/20° C. 0.986, observed molecular weight 220 (theoretical 230), observed equivalent weight 118 (theoretical 115). The yield and efficiency were 99 percent based on the diol. This colorless, water insoluble diacetate is a new compound.

(c) A 1 inch stainless steel tube 3 feet long was packed with 450 cc. of 4 x 8 mesh activated alumina catalyst. While the catalyst was heated at 375° C., the diacetate was fed at the rate of 50 cc. per hour. The product made from 228 grams of ester was fractionated under reduced pressure to obtain 91 grams of mixed 2,5-dimethylhexadienes. Analysis of the dimethylhexadiene fraction showed that 60 percent of it was 2,5-dimethyl-2,4-hexadiene and the balance was 2,5-dimethyl-1,5-hexadiene. The overall yield and efficiency to the dimethylhexadienes was 83 percent. These 2,5-dimethylhexadienes were separated readily by either fractional distillation or by fractional crystallization. Since the 2,5-dimethyl-1,5-hexadiene is isomerized to the desired 2,5-dimethyl-2,4-hexadiene by passing over activated alumina catalyst or by an acid catalyst in the liquid phase, the former diene may be recycled with the diacetate to the vapor phase reaction tube to produce more 2,5-dimethyl-2,4-hexadiene.

What is claimed is:

1. A process for preparing a mixture of 1,6-diacetoxy-2,5-dimethyl-2-hexene; 1,2,6-triacetoxy-2,5-dimethylhexane; and 2,5-dimethyltetrahydropyran-2-methanol acetate which comprises forming a mixture of 2,5-dimethyltetrahydropyran-2-methanol, acetic anhydride and a catalyst selected from the group consisting of a Lewis acid and a strong mineral acid and heating said mixture at a temperature of 140° C. to 160° C.

2. A process for preparing 1,6-diacetoxy-2,5-dimethyl-2-hexene which comprises forming a mixture of 2,5-dimethyltetrahydropyran-2-methanol, acetic anhydride and a catalyst selected from the group consisting of a Lewis acid and a strong mineral acid and heating said mixture at a temperature of 140° C. to 160° C.

3. A process for preparing 1,6-diacetoxy-2,5-dimethyl-2-hexene which comprises forming a mixture of 1,2,6-triacetoxy-2,5-dimethylhexane, acetic anhydride and a catalyst selected from the group consisting of a Lewis acid and a strong mineral acid and heating said mixture at a temperature of 140° C. to 160° C.

4. A process for preparing 1,6-diacetoxy-2,5-dimethyl-2-hexene which comprises forming a mixture of 2,5-dimethyltetrahydropyran-2-methanol acetate, acetic anhydride and a catalyst selected from the group consisting of a Lewis acid and a strong mineral acid and heating said mixture at a temperature of 140° C. to 160° C.

References Cited in the file of this patent

UNITED STATES PATENTS

| | | |
|---|---|---|
| 2,610,193 | Whetstone et al. | Sept. 9, 1952 |
| 2,773,895 | Ballard et al. | Dec. 11, 1956 |
| 2,852,531 | Hoffman | Sept. 16, 1958 |
| 2,910,520 | Guest et al. | Oct. 27, 1959 |

OTHER REFERENCES

Carriere: Beilsteins Handbuch, 4th Ed., vol. 2, 2nd. Supp., page 158 (1943).

Simon et al.: Helv. Chim. Acta., vol. 29, pages 1133–44 (1946).